INVENTORS
LAWRENCE G. HESS
DONALD C. THOMAS
BY Robert J. Eichelburg
ATTORNEY

United States Patent Office 3,513,632
Patented May 26, 1970

3,513,632
SEPARATION OF ACRYLIC ACID AND ACROLEIN
Lawrence G. Hess, Charleston, and Donald C. Thomas, St. Albans, W. Va., assignors to Union Carbide Corporation, a corporation of New York
Continuation of application Ser. No. 572,572, Aug. 15, 1966. This application Dec. 18, 1968, Ser. No. 786,828
Int. Cl. B01d *19/00*
U.S. Cl. 55—56                                    4 Claims

ABSTRACT OF THE DISCLOSURE

A method for separating acrylic acid and acrolein from a gaseous mixture by scrubbing the gaseous mixture with water at a temperature between the boiling temperature of acrolein and the boiling temperature of acrylic acid. The scrubbing liquid is then stripped of the absorbed components by heating while the unabsorbed gas stream is scrubbed in a second absorber.

---

Figure 1:
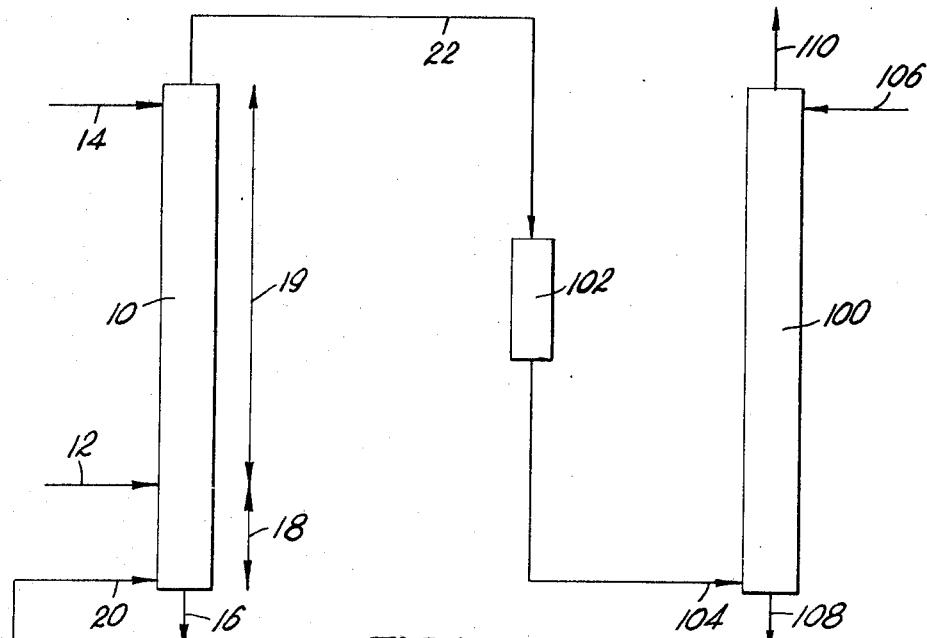

This application is a continuation of Ser. No. 572,572 filed Aug. 15, 1966, and now abandoned.

The present invention relates to a novel method for the separation and recovery of acrylic acid and/or acrolein from a gas stream. More specifically, the present invention relates to a method for the separation and recover of acrylic acid and acrolein as oxidation products from the oxidation of propylene.

Several processes are known in the prior art for the preparation of acrylic acid and acrolein by vapor phase oxidation of propylene as disclosed, for example, in U.S. Pats. 3,089,909 and 3,094,565. Basically, the prior art teaches method for the oxidation of propylene to obtain a gaseous mixture of acrylic acid, acrolein, acetic acid, water, unconverted propylene, other hydrocarbon oxidation products and a large volume of inert gas. The two-step process is similar, however, propylene is subjected to mild oxidation conditions in a first stage to form acrolein followed by oxidation of acrolein in a second stage to form acrylic acid. Both the single and two-stage oxidations are conducted while the reactants are in the vapor phase. Whether the single-stage or two-stage oxidation is employed, operating conditions usually are such that the reactor effluent contains only low concentrations of acrylic acid (about 0.10–10%) and acrolein (about 0.10–10%) which then must be separated from large amounts (usually about 50–80%) of inert gas, and from about 1–30% steam. An economical and efficient process is consequently needed to recover and separate the acrylic acid and acrolein.

The prior art recovery methods for the separation of acrolein include water-scrubbing, refrigeration, and scrubbing with ketones. It is known furthermore in the prior art that mixtures of acrylic acid and acrolein may be recovered by water-scrubbing; however, the aqueous product obtained by this procedure contains minimal amounts of acrylic acid, usually below about 1% acrylic acid at 100% acrolein recovery, whereas the acrylic acid product recovered contains substantial quantities of acrolein usually in the order of about 0.5–2.5%. It is essential that the presence of acrolein be avoided in the acrylic acid stream so as to effect economical recover of both acrylic acid and acrolein. An additional disadvantage is that acrolein present in this aqueous acrylic acid has been found to polymerize in the acrylic acid extraction apparatus or is cumbersome to recover from solvents used in the extraction. When propylene oxidation products comprising mixtures of acetic acid and acrylic acid are separated from acrolein, the acrylic acid and acetic acid must be further separated which is best accomplished by a two-solvent extraction system in which one of the solvents is isopropyl ether. Minor amounts of acrolein in the acrylic acid-acetic acid mixture form an azeotrope, with isopropyl ether, from which it is extremely difficult to recover acrolein, thereby accounting for an additional disadvantage. Accordingly, a quantitative recovery of acrylic acid from mixtures with acrolein is highly desirable.

Although acetic acid, an important by-product of propylene oxidation, may be separated by distillation, this method is extremely difficult to use with any efficiency when compared to the two-solvent extraction procedure. Accordingly there would be economical advantages in recovering acrylic acid-acetic acid oxidation products from acrolein mixtures which would lend itself to further separation by the two-solvent system. The two-solvent extraction process for the separation of acetic acid and acrylic acid is operated most efficiently at acryylic acid concentrations from about 10 to about 40%.

It is therefore an object of the present invention to avoid these and other difficulties encountered in the prior art. More specifically, it is an object of this invention to provide a method for the quantitative recovery of acrylic acid and acrolein from a gas stream. It is the further object of this invention to separately recover acrylic acid and acrolein at relatively high concentrations of acrylic acid, generally from about 10 to about 40% from the oxidation products of propylene which contain anywhere from about 0.1 to about 10% acrylic acid, about 0.1 to about 10% acrolein, about 50 to about 80% inert gas such as nitrogen and about 1 to about 30% steam. It is a further object of this invention to effect such quantitative separation and recovery of acrylic acid from gas streams containing anywhere from about 100 parts per million to 100% acrylic acid and acrolein no matter what the ratio of one to the other.

These and other objects have been achieved by the method of the present invention which enables the separate and quantitative recovery of acrylic acid and/or acrolein from an inert gas stream by water-scrubbing the gas stream at elevated temperatures in a first scrubber having a gas stripping zone to remove acrolein as a gas, thereby obtaining acrylic acid and acetic acid if any is present and scrubbing the gaseous effluent of the first scrubber in a second scrubber to remove acrolein preferably by water scrubbing. Acrylic acid may thereby be recovered at concentrations of about 10 to about 40% as an aqueous solution reasonably free from acrolein even though the gas fed into the first scrubber may contain as little as from about 100 parts per million up to 100% acrylic acid admixed with acrolein no matter what the ratio of acrylic acid to acrolein.

This concentration solution of acrylic acid enables economical recovery of the acid and also constitutes a suitable feed stock for efficient separation of acrylic acid from by-product acetic acid if any is present by means of two-solvent extraction with, for example, isopropyl ether.

Thus the separation and complete recovery of both acrylic acid and acrolein and the quantitative recovery of acrylic acid, as a reasonably concentrated solution free of acrolein constitutes the essential features of the invention which may be further understood by reference to the attached drawing in which;

FIG. 1 relates to the apparatus employed for the novel separation and recovery system.

Figure 2:
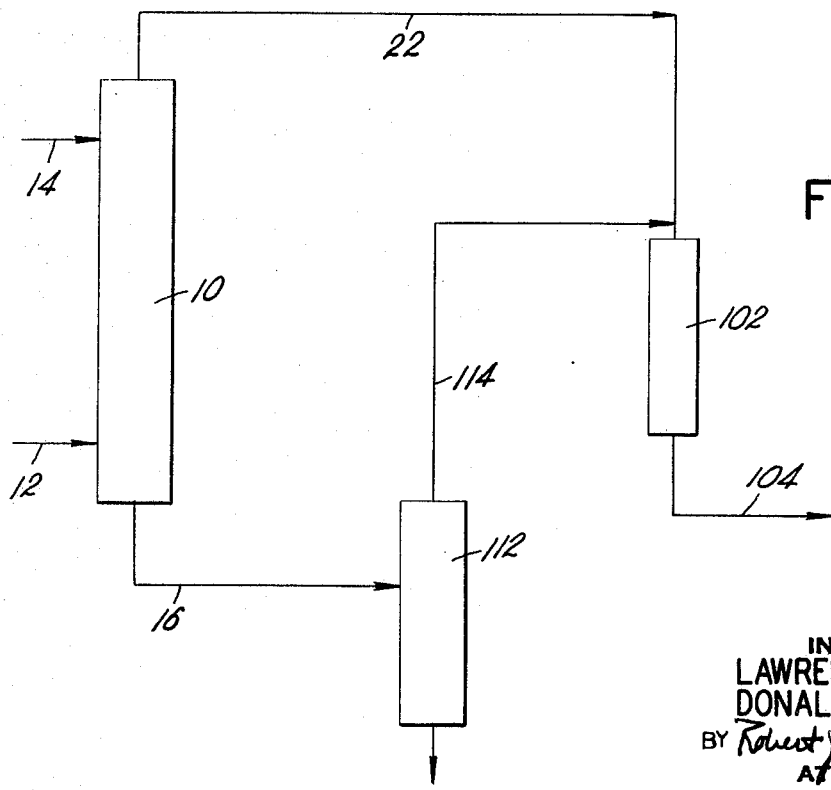

FIG. 2 relates to a system as in FIG. 1 but modified by the inclusion of acrylic acid still 112.

Referring to FIG. 1, the invention broadly consists of a scrubbing system comprising a scrubber 10 and scrubber 100 operated in series. Unrefined gas containing acrylic acid and acrolein is introduced into scrubber 10 by inlet gas feeding means 12 and is washed countercurrently by a water stream, introduced by inlet means 14, at elevated temperatures in order to remove acrylic acid by aqueous acid effluent means 16 as an aqueous solution from the base of scrubber 10. In this respect the water introduced through influent 14 leading into scrubber 10 must be above the boiling point of acrolein determined according to the operating pressures within the system. At least one theoretical stage is provided in a reflux zone 19 and at least on theoretical stage in stripping zone 18 respectively, in scrubber 10 on opposite sides of inlet gas feeding means 12. The determination of the theoretical stages by packing means or mechanical trays is easily determined by one having ordinary skill in the art, knowing the other dimensions and parameters applicable to scrubber 10. The method used for the computation of "theoretical stages" is described by Chilton and Colburn Ind. Eng. Chem. vol. 27, 255 et seq. (1935). Stripping zone 18 comprises means for stripping acrolein from aqueous acrylic acid by the use of either a heat source such as a heat exchanger, an evaporator, or other indirect heat source below the stripping zone and/or by the continuous injection of steam or other inert gas below the stripping zone at point 20 of scrubber 10.

The first scrubber 10 may consist of one or more absorption towers in a multi-tower system for the recovery of acrylic acid and may be operated in series and/or parallel with respect to the gas flow pattern. The gas stripped of acrylic acid leaves scrubber 10 by effluent means 22 and is fed to the base section at a point 104 of the second scrubber 100 in which acrolein is separated and recovered. Optional cooling means 102 is provided in a cooling and heat exchange relationship with gas effluent means 22 to increase the efficiency in recovering acrolein in scrubber 100. A countercurrent flow of unheated water or other suitable solvent is led into scrubber 100 by means of water influent means 106 whereby quantitative absorption of acrolein is effected and a solution of acrolein obtained which is withdrawn at the base of scrubber 100 by an acrolein solution effluent means 108. Although water is very effective and the preferred scrubber fluid for acrylic acid, it is somewhat less effective for the recovery of acrolein. Alternative solvents or liquids more effective than water which may be used for the recovery of acrolein include: aromatic hydrocarbons such as chlorobenzene, xylene isomers; ketones such as diisobutyl ketone, methyl isobutyl ketone, methyl phenyl ketone, phenetole; normally liquid esters such as n-butyl acetate, ethyl propionate, ethyl acetoacetate; ethers such as diisopropyl ether, phenyl ethyl ether; nitriles such as n-butyronitrile; and amides such as dimethyl formamide. Gas may be vented through second scrubber gaseous effluent means 110. Scrubber 100 is operated in series with and downstream of the acrylic acid scrubber 10.

The acrolein scrubber means essentially comprising scrubber 100 may consist of one or more absorption devices which may be operated in series and/or in parallel with respect to the gas flow. One or more of the scrubbers comprising acrolein scrubber 100 may be operated with parallel gas-liquid flow when quantitative recovery of acrolein is not deemed necessary.

In an alternate embodiment according to FIG. 2 the source of heat or inert gas introduced by influent means 20 in FIG. 1 is omitted and an aqueous acrylic acid still 112 connected with scrubber 10 by aqueous acrylic effluent means 16 leading from scrubber 10 and an acrolein effluent means 114 leading from still 112 into acrolein effluent means 22 and intersectiong said means at a point above optional cooler 102 when such cooler is user.

Thus the preferred forms of the invention have been shown by means of FIGS. 1 and 2 and the description relating to the operation of such apparatus. The column diameters of absorption towers or scrubbers 10 and 100 are of a proper dimension to prevent flooding by using design method well known to one having ordinary skill in the art of gas-liquid contacting. The method of Sherwood Ind. and Eng. Chem. vol. 30, p. 765 et seq. (1938), or more recent correlations can be used to determine capacity if a packed absorption column is used. The required height of packing in the scrubber 10 and scrubber 100 varies depending upon the size and type of the packing and upon the absolute mass velocities of the gas and liquid phases. Again, this is well within the ability of one having ordinary skill in the art. The required number of theoretical stages in the two scrubber systems is as follows:

|  | Minimum | Preferred | Operative |
| --- | --- | --- | --- |
| Acrylic Acid Scrubber 10: | | | |
| Total | 2 | 7-20 | 2-20 |
| Above gas inlet | 1 | 3-10 | 1-10 |
| Above gas inlet [1] | 1 | 4-10 | 1-10 |
| Acrolein Scrubber 100: | | | |
| Total | 4 | 6-10 | 4-10 |
| Above gas inlet | 4 | 6-10 | 4-10 |

[1] Stripping zone.

The principal effect of number of theoretical stages is upon the quantity of scrub water that will be required to obtain the desired extent of recovery.

The separation process is preferably operated above atmospheric pressure to reduce the required column diameter in scrubber 10 and scrubber 100. The application of pressure is also very important in reducing the amount of scrub water that must be added to the top of the columns—particularly to the acrolein scrubber.

For example at 99.99 percent recovery of acrolein in a nine-theoretrical stage scrubber operated at 30° C., the water requirement varies with pressures as follows:

| Pressure, p.s.i.a. | Water Requirement [2] | |
| --- | --- | --- |
|  | Acrylic Acid Scrubber | Acrolein Scrubber |
| 14.4 | 9 | 180 |
| 139.4 | 5 | 60 |

[2] Pounds of scrubbing water feed per pound of component in the inlet gas.

Higher operating pressures further reduce the scrubbing water requirement. The operating pressure in both the acrylic acid and acrolein scrubber ranges from about 10 to about 700 p.s.i.a., with the range about 20 to about 250 p.s.i.a. most preferred. Any pressure above atmopheric can be practiced in individual cases. The available pressure of the raw inlet gas is generally the deciding factor. Even though the above data indicate the durability of operating at elevated pressures the method of the invention is also operable at subatmospheric pressures.

The use of a stripping zone 18 in the base section of the first (acrylic acid) scrubber 10 is mandatory for effective removal or acrolein from the acrylic acid. This zone may be provided by installation of a calandria at the base section of the scrubber, or by the direct injection of steam or inert gas at this point, and the provision of at least one theoretical stage of separation above this point and below the inlet gas entry of separation above this point and below the inlet gas entry point in the column. Alternately the still 112 may be used as shown in FIG. 2.

Temperature is also an important variable in the separation and recovery process. Generally scrubber 10 may be operated between the boiling temperature of acrolein (52.5° C. at 1 atm.) and acrylic acid (141.9° C. at 1 atm.) and mixtures thereof, the temperature varying depending upon the pressure employed in scrubber 10 and the relative concentration of the solution components. These conditions are employed for the separation and recovery of acrolein and acrylic acid from a gas stream substantially free from other impurities such as acetic acid, and acetaldehyde. Where the method and apparatus of the present invention is employed for the separation and recovery of acrylic acid and acrolein obtained by the oxidation of propylene scrubber 10 is operated at temperatures between the boiling temperature of acrolein and the boiling temperature of acetic acid (118.1° C. at 1 atm.) and mixtures thereof and other impurities that may be present in the solution.

Likewise, acrolein scrubber 100 is operated up to but not including the boiling temperature of acrolein when a substantially pure gas stream comprising acrylic acid and acrolein free from hydrocarbon oxidation products and hydrocarbons is treated. Again, this boiling temperature will vary depending on the pressure within scrubber 100 and the concentration of impurities if any are present in the solution. If, however, the method of the invention is employed to treat acrylic acid and acrolein obtained by the oxidation of propylene, acrolein scrubber 100 is operated at temperatures so as to remove the oxygenated organic compounds in the liquid effluent as for example at temperatures between the boiling temperatures of acetaldehyde (21° C. at 1 atm.) and acrolein and mixtures thereof and other impurities that may be present in the solution.

In defining the temperature ranges for the operation of scrubbers 10 and 100 the boiling temperatures of various pure components are given as the upper or lower limits of operation and where two limitations on temperature are specified the boiling temperatures of two compounds are given as well as mixtures thereof and impurities that might also be present. These definitions are intended to take into account the fact that mixtures of two components of a solution may have a boiling temperature either higher or lower than the pure components and that boiling temperature will change as the ratio of components change, but the amount of change in boiling temperature is limited by the highest boiling component and lowest boiling component of the system. Thus, for example, although one operating range is defined as falling between 52.5° C. and 141.9° C. at one atmosphere (the boiling temperatures of acrolein and acrylic acid respectively) this range is intended to include any variations in boiling temperature above or below 52.5° C. and 141.9° C. for mixtures of acrolein and acrylic acid due to any elevation or depression of the boiling points of each effected by the solution of one component in the other, especially where additional impurities are present, as in the case of treating a propylene oxidation product, which may result in a ternary, quaternary or other multi-component system.

In describing the operating temperatures of scrubber 10 and scrubber 100 the expression "between" is meant to exclude the boiling temperature of the particular compound referred to. As an illustration, by operative temperatures residing between the boiling temperature of acrolein and acrylic acid and mixtures thereof, it is intended to include temperatures ranging between 52.5° C. and 141.9° C. at 1 atmosphere pressure where such pressure limitation is specified, but exclusive of the outer limits 52.5° C. and 141.9° C. of this temperature range.

Optimum temperature depends upon the operating pressure in acrylic acid scrubber 10 according to the following relations as well as the ranges empirically determined between these limits:

| | Acrylic Acid Scrubber Temperature, ° C. | |
| --- | --- | --- |
| Pressure, p.s.i.a. | Reflux Zone 19 (top temperature) | Stripping Zone 18 (base temperature) |
| 14.4 | 52–110 | 80–140 |
| 139.4 | 85–179 | 110–225 |

Temperatures in acrolein scrubber 100 should be as low as practicable. The most effective scrubber temperatures for a given operating pressure will be determined, primarily, by the amount of contained water and steam present in the inlet feed gas, and can be controlled, at least partially, by adjusting, for example, the inlet gas temperature. The temperature may vary up to but not including the boiling point of acrolein or between the boiling point of acetaldehyde and the boiling point of acrolein; however, the preferred temperature here should be no higher than 40° C., and should especially be between 5° C. and 20° C. To obtain this temperature in the second scrubber, a gas cooling device 102 is highly desirable. This cooling device can simply be an indirect cooler using air or cooling water or can be a sparger for direct injection of water.

An inhibitor is preferably added to the acrylic acid and acrolein scrubbers to prevent polymerization. The inhibitor may be injected at the top of the column or fed with the scrubber liquid. Suitable inhibitors include hydroquinone, monomethylether of hydroquinone, phenothiazine, and the like.

The scrubbing towers used in this invention need not be of the packed type, but could employ any type of gas-liquid contactor (spray towers, cyclone scrubbers, stirred absorbers) suitably arranged. A description of the types of contactors suitable in this regard is contained in Perry's Chemical Engineer's Handbook, pp. 14–35 to 14–39 (1963) McGraw-Hill.

The method of the invention is applicable to the preparation of methacrolein and methacrylic acid by isobutylene oxidation and is broadly applicable to this separation of a gaseous mixture containing an aldehyde and an organic acid of the same carbon number in an inert gas. Acids and aldehydes specifically falling with this category and which are suitable for the purposes of this invention contain anywhere from 1–10 carbon atoms inclusively.

The following non-limiting examples are included as certain preferred embodiments of the invention.

The recovery procedure illustrated in the following examples may be conducted using a feed gas stream containing about 3 weight percent each of acrylic acid and acrolein. This separation and recovery procedure, however, has been found to be effective over very wide ranges comprising from about 100 parts per million on a volume basis to essentially 100 percent acrylic acid plus acrolein. In the feed gas the ratio of acrylic acid to acrolein is not critical and only affects the emperically determined water flow rates to scrubber 10 and scrubber 100.

EXAMPLE 1

A recovery system, consisting of two scrubbing towers constructed of 2-inch internal diameter stainless steel pipe, is connected as shown in FIG. 1. The scrubbing towers are 68-inches high, and are packed with ¼-inch ceramic saddles to provide efficient gas-liquid contact. A crude propylene oxidation mixture is fed continuously to a point about 16 inches above the bottom of the first tower. The space below this point provides a stripping section, and this section is heated by the hot vapors produced in an electrically-heated boiler attached to the bottom of the first tower. The crude oxidation mixture fed to the first tower is gaseous and consists of 90 grams of acrolein, 101 grams of acrylic acid, and 6 grams of acetic acid in 1979 gm. nitrogen and 174 gm. of oxygen. The total gaseous flow is 1605 liters per hour measured at standard temperature and pressure (S.T.P.).

Water is fed continuously to the top of the acrylic acid scrubber at the rate of 6 lbs. water per lb. of acrylic acid contained in the gaseous feed, and the water feed to the second (acrolein) scrubber is 150 lbs. per pound of acrolein. The aqueous product from the first scrubbing tower is withdrawn continuously from the base of the tower and contains 191 gm. of acrylic acid, and only 0.8 gm. of acrolein. The aqueous product from the second scrubbing tower is withdrawn continuously from the base and contains 89.2 gm. of acrolein and less than 0.02 gram of acrylic acid.

Quantitative (100 percent) recovery of the acrylic acid contained in the inlet gas is effected based on a comparison of the acrylic acid content of the gas fed into the scrubber and the aqueous product exiting the base of the acrylic acid scrubber; 98.1 percent of the acrolein in the inlet gas is recovered continuously as a separate aqueous solution from the base of the second (acrolein)

scrubber. The acrylic acid content in the acrylic acid scrubber product is 12.7 percent by weight, a suitable concentration in the product for further refining.

The effective recovery and separation of contained acrylic acid and acrolein, by the scrubber is:

Acrylic acid scrubber effluent: Percent
   Recovery of acrylic acid in feed _____ 100
   Recovery of acrolein in feed _____ 0.9

Acrolein scrubber effluent:
   Recovery of acrylic acid in feed _____ 0.0
   Recovery of acrolein in feed _____ 99.1

The above set of results are not to be construed as the optimum separation and recovery using this procedure. A higher height of packing in the scrubbers, and in the stripping zone of the acrylic acid scrubber provide even better separation of acrolein from acrylic acid and even more complete recovery of acrolein.

EXAMPLE II

Using the apparatus described in Example I under similar operating conditions, but operating the acrylic acid scrubber in a conventional manner without use of a calandria at the base of the acrylic acid scrubber, gave quantitative recovery of acrylic acid into the acrylic acid scrubber product as before. However, this product also contained 10.6 percent of the total acrolein—an excessive acrolein concentration that caused severe polymerization within the refining equipment used to separate the acrylic acid from by-product acetic acid.

The effective recovery and separation of contained acrylic acid and acrolein by the scrubber is:

Acrylic acid scrubber effluent: Percent
   Recovery of acrylic acid in feed _____ 100.0
   Recovery of acrolein in feed _____ 10.6

Acrolein scrubber effluent:
   Recovery of acrylic acid in feed _____ 0.0
   Recovery of acrolein in feed _____ 89.4

Although the invention has been described by reference to certain preferred embodiments, it is not intended that the novel method and apparatus be limited thereby, but that certain modifications are intended to be embodied within the spirit and the broad scope of the following claims.

What is claimed is:
1. A method for the separation of acrolein and acrylic acid consisting essentially of scrubbing a gaseous mixture of acrylic acid and acrolein with water at from about 20 to about 250 p.s.i.a. and between the boiling temperature of acrolein and the boiling temperature of acrylic acid to obtain a water phase comprising aqueous acrylic acid, and a gas phase comprising acrolein, collecting said water phase after said scrubbing and gas stripping said collected water phase by heating at a temperature above the boiling temperature of acrolein to evolve a gas comprising acrolein and said acrylic acid is separated from said gaseous mixture in substantially quantitative amounts.

2. The method of claim 1 consisting essentially of water scrubbing said gas comprising acrolein and gas phase comprising acrolein up to but not including the boiling point of acrolein.

3. The method of claim 2 consisting essentially of water scrubbing said gas phase comprising acrolein and gas comprising acrolein at from about 20 to about 250 p.s.i.a. and between the boiling temperature of acetaldehyde and the boiling temperature of acrolein.

4. A process for separating the water soluble oxidation products of propylene including acrolein and acrylic acid to obtain aqueous solutions of both acrolein and acrylic acid, each relatively free of the other component which consists essentially of introducing a gaseous stream of propylene oxidation products containing about 0.1 to about 10% acrolein and about 0.1 to about 10% acrylic acid at an intermediate point in a thermally graded first scrubbing zone counter-currently to a stream of water at a pressure from about 20 to 250 p.s.i.a. and a temperature between the boiling temperature of acrylic acid and the boiling temperature of acrolein, generating a partial gas phase in the hotter portion of said scrubbing zone and recovering a liquid aqueous phase therefrom containing the acrylic acid relatively free of acrolein, recovering a gas stream containing acrolein from the cooler portion of said first scrubbing zone and passing said gas stream to a second scrubbing zone counter-currently to a stream of water at a pressure of from about 20 to 250 p.s.i.a. and a temperature below the boiling temperature of acrolein and removing therefrom an aqueous solution of acrolein relatively free of acrylic acid, said acrylic acid being separated from said water soluble oxidation products of propylene in substantially quantatative amounts.

References Cited

UNITED STATES PATENTS

| | | | |
|---|---|---|---|
| 2,514,968 | 7/1950 | Dunn | 55—51 |
| 3,359,309 | 12/1967 | Young et al. | 260—604 |
| 3,403,177 | 9/1968 | Brown | 260—604 |

FOREIGN PATENTS 975,684    11/1964    Great Britain.

Morrison et al., Organic Chemistry, Allyn and Bacon, 1963, p. 729.

REUBEN FRIEDMAN, Primary Examiner

C. N. HART, Assistant Examiner

U.S. Cl. X.R.

55—94; 260—604